April 1, 1958 W. F. HOLIN 2,829,015
BEARING ASSEMBLY
Filed March 28, 1955
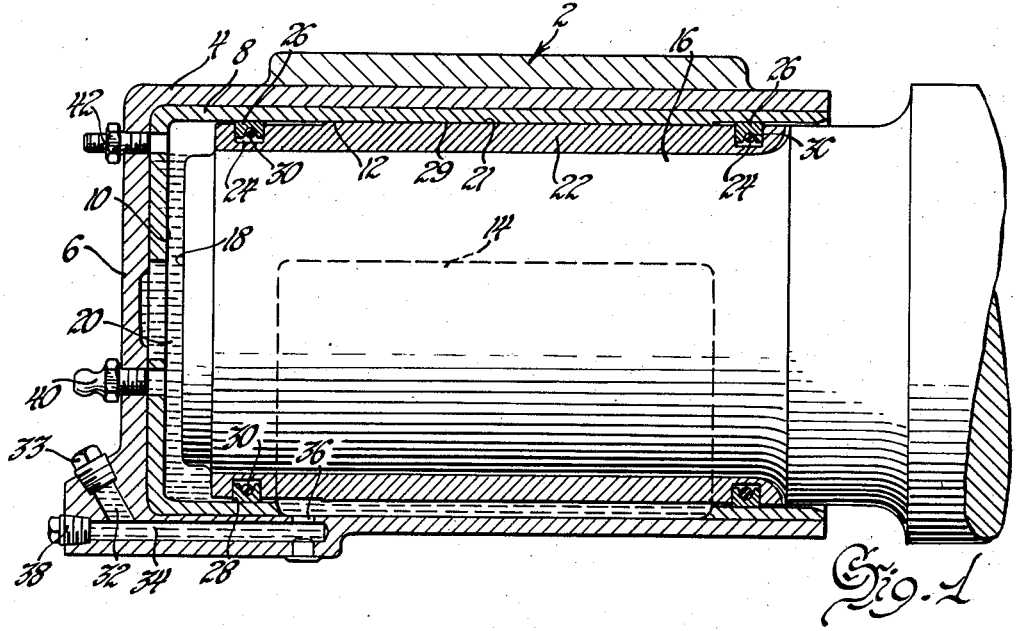
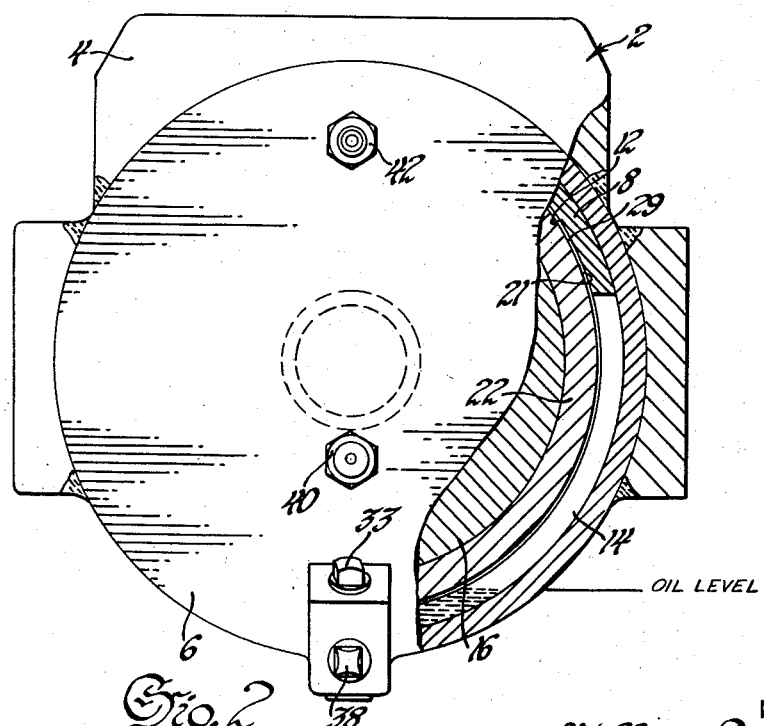
Inventor
William F. Holin
By S. C. Thorpe
Attorney

United States Patent Office 2,829,015
Patented Apr. 1, 1958

2,829,015

BEARING ASSEMBLY

William F. Holin, Riverside, Ill., assignor to General Motors Corporation, Detroit, Mich., a corporation of Delaware Application March 28, 1955, Serial No. 497,172

5 Claims. (Cl. 308—79)

This invention relates generally to bearings and more particularly to bearing assemblies in which both radial and thrust pressures are exerted. The invention, although capable of broader application as will presently appear, is exemplified in connection with railroad journal box assemblies and the journals on the ends of railroad wheel and axle sets.

One of the difficulties encountered particularly in railroad journal box assemblies is that a high level of lubricant cannot be maintained between the end of the railroad journal and the closed end of the journal box, where it is necessary, without also maintaining a high level of lubricant between the radial bearing surfaces of journal and box, where it is undesirable. A further difficulty is that while one type of lubricant with a certain viscosity may be quite suitable for thrust bearing surfaces and another lubricant having a different viscosity may be suitable for the radial bearing surfaces, there is no means which enables different viscosity lubricants to be used without danger of intermixing of the lubricants.

It is therefore an object of the present invention to uniquely separate the thrust bearing surfaces from the radial bearing surfaces of a bearing assembly so that different lubricant levels may be maintained and so that lubricants having different viscosities may be used.

For a further understanding of the invention and the above and other objects thereof reference may be had to the accompanying detailed description and drawing, in which:

Fig. 1 is a view partially in section through a journal box showing a journal of a railroad wheel and axle set received in the journal box assembly with a centrifugal seal uniquely separating the radial bearing surfaces of the assembly from the thrust bearing surfaces.

Fig. 2 is an end view of the journal box assembly with portions broken away and with the journal end received therein to illustrate the radial surfaces of the journal and journal box and how this clearance is enlarged by an annular-like recess for the reception of lubricant in the lower circumferential portion thereof.

Referring now to the drawing, a journal box assembly is indicated by the numeral 2 and comprises an outer cylindrical casing 4 closed at one end 6 in which is received a cylindrical bearing insert 8 closed at one end and having a thrust bearing surface 10 and an inner cylindrical bearing surface 12. As indicated in both figures of the drawing, the insert 8 is provided with an annular-like recess or window 14 which in combination with the casing 4 provides a semi-annular enlargement in the lower peripheral portion of the journal box assembly.

Received in the journal box assembly within the insert 8 is a journal 16 formed on one end of a railroad wheel and axle set. The end of the journal 16 includes a thrust bearing surface 18 which moves as the journal moves axially to form a variable clearance or chamber 20 between the thrust bearing surfaces 10 and 18. The journal 16 includes a bearing sleeve 22 which fits over the main part of the journal and has an outer cylindrical bearing surface 21. In either end of the sleeve 22 are annular grooves or recesses 24 in which reside centrifugal seals 26. The seals 26 each comprise a sealing strip 28 acted on by an annular spring member 30 which tends to cause the seal to expand outwardly out of the groove 24 around the circumference thereof under the influence of centrifugal forces caused by the rotation of the journal. In other words, the faster the journal rotates relative to the journal box assembly the more tightly the sealing strips 28 tend to engage the inner cylindrical surface 12 of the bearing insert 8 and the sides of the grooves 24. It will be observed that the seal 26 adjacent the left-hand or free end of the journal, as viewed in Fig. 1, actually separates the thrust bearing surfaces of both the journal and the journal box from the cylindrical bearing surfaces of these two members so that a level of lubricant between the thrust bearing surfaces 10 and 18 may be controlled independently of the level of lubricant between the inner and outer cylindrical surfaces 12 and 21. The other seal serves to complete the annular lubricant chamber 29 formed between the cylindrical bearing surfaces 12 and 21. In order to conduct lubricant to the recess 14 and between the cylindrical bearing surfaces 12 and 21 a fill passage 32 having a fill plug 33 in one end thereof has been drilled or otherwise provided in the casing 6 at the lower end thereof which communicates with a passage 34 extending axially of the casing. Passage 34 in turn communicates with a small passage 36 leading to the recess 14. To remove or drain the lubricant from between the cylindrical bearing surfaces 12 and 21 and from the recess 14 a drain plug 38 has been provided in one end of the passage 34.

In order to introduce lubricant to the chamber or clearance 20 formed between the thrust bearing surfaces 10 and 18 a lubricant fitting 40 has been provided in the end wall 6 of the casing 4. Since a certain amount of relative movement takes place between the surfaces 10 and 18 a breather fitting 42 has also been provided in the end wall 6 toward the upper part of the chamber 20, thereby connecting the chamber with the atmosphere so that "breathing" may take place between the atmosphere and the chamber 20.

From the foregoing description it will be observed that one of the seals 26 actually divides the clearance between the cylindrical bearing surfaces 12 and 21 and the clearance between the thrust bearing surfaces 10 and 18 into two separate clearances or chambers 20 and 29 so that lubricants of different viscosities may be used and also maintained at different levels. By using centrifugal seals increased sealing forces are generated upon faster rotative speeds of the journal with respect to the journal box which tend to increasingly resist the pressures between the surfaces 10 and 18 tending to force the two separate kinds of lubricant together past the seal. In other words, the centrifugal seals 26 exert the greatest pressures when they are most needed.

What I claim is:

1. In a journal box including an inner thrust bearing surface and an inner cylindrical bearing surface, a journal in said journal box having an outer cylindrical bearing surface and an outer thrust bearing surface bearing against said inner cylindrical bearing surface and inner thrust bearing surface respectively and forming clearance therewith, and centrifugal sealing means recessed in said outer cylindrical bearing surface and interposed between said inner and outer cylindrical bearing surfaces adjacent said thrust surfaces dividing said clearance into a thrust bearing lubricant chamber and a cylindrical bearing lubricant chamber.

2. In a railroad journal box assembly a hollow cylindrical bearing insert closed at one end thereof and forming an inner cylindrical bearing surface and an inner thrust bearing surface, a journal received in said cylindrical bearing insert and having an outer cylindrical bearing surface and an outer thrust bearing surface cooperating respectively with the said inner cylindrical bearing surface and inner thrust bearing surface, and centrifugal sealing means recessed in said outer cylindrical bearing surface and interposed between said inner and outer cylindrical bearing surfaces adjacent said thrust bearing surfaces preventing lubricant between said thrust bearing surfaces from entering between said cylindrical bearing surfaces.

3. A bearing assembly comprising a hollow cylindrical member closed at one end thereof and forming an inner cylindrical bearing surface and an inner thrust bearing surface, a journal in said cylinder having an outer cylindrical bearing surface and an outer thrust bearing surface bearing against said first-mentioned cylindrical and thrust bearing surfaces respectively said thrust bearing surfaces and said cylindrical bearing surfaces having limited clearance therebetween, the outer cylindrical bearing surface of said journal having an annular groove therein adjacent said thrust bearing surfaces, and centrifugal sealing means mounted in said groove and separating said clearance between said surfaces into a thrust bearing lubrication chamber and a cylindrical bearing lubrication chamber whereby lubricants of different viscosities can be used in said chambers to lubricate said surfaces.

4. A bearing assembly comprising a hollow cylindrical member closed at one end thereof and forming an inner cylindrical bearing surface and an inner thrust bearing surface, a journal in said cylinder having an outer cylindrical bearing surface and an outer thrust bearing surface bearing against said first-mentioned cylindrical and thrust bearing surfaces respectively, said thrust bearing surfaces and said cylindrical bearing surfaces having limited clearance therebetween, the cylindrical bearing surface of said journal having an annular groove therein adjacent said thrust bearing surfaces, and centrifugal sealing means mounted in said groove and separating said clearance between said surfaces into a thrust lubrication chamber and a cylindrical bearing lubrication chamber whereby lubricants of different viscosities can be used in said chambers to lubricate said surfaces, said member having a passage in the end thereof communicating with said thrust lubrication chamber, a closable lubrication fitting secured in said passage for conducting lubricant into said thrust lubrication chamber, a breather fitting in the end of said member connecting the upper portion of said thrust lubrication chamber with the atmosphere, said inner cylindrical bearing surface having an annularly extending recess enlarging said cylindrical bearing lubrication chamber, and lubricant feeding and drainage means communicating with said recess.

5. In a journal box including an inner thrust bearing surface and an inner cylindrical bearing surface, a journal in said journal box having an outer thrust bearing surface and an outer cylindrical bearing surface bearing against said first-mentioned thrust bearing surface and cylindrical bearing surface respectively and forming clearances therebetween, first centrifugal sealing means recessed in said outer cylindrical bearing surface and interposed between said cylindrical bearing surfaces adjacent said thrust surfaces separating the clearance between said thrust surfaces from the clearance between said cylindrical bearing surfaces, and second centrifugal sealing means recessed in said outer cylindrical bearing surface and interposed between said cylindrical bearing surfaces spaced axially from said first sealing means and more remote from said thrust surfaces and said first sealing means.

References Cited in the file of this patent
UNITED STATES PATENTS

| | | |
|---|---|---|
| 1,145,090 | Stoner | July 6, 1915 |
| 2,710,779 | Jackson | June 14, 1955 |
| 2,751,266 | Palmgren et al. | June 19, 1956 |